US010823296B2

(12) United States Patent
Fratantonio et al.

(10) Patent No.: US 10,823,296 B2
(45) Date of Patent: Nov. 3, 2020

(54) ELECTRIC MIXING VALVE WITH DUAL FLOWPATH METERING BALL

(71) Applicant: Watts Regulator Co., North Andover, MA (US)

(72) Inventors: Matthew Fratantonio, Northboro, MA (US); Steven Hofmann, Haverhill, MA (US); Donald K Morse, Worcester, MA (US)

(73) Assignee: Watts Regulator Co., North Andover, MA (US)

( * ) Notice: Subject to any disclaimer, the term of this patent is extended or adjusted under 35 U.S.C. 154(b) by 27 days.

(21) Appl. No.: 16/217,306

(22) Filed: Dec. 12, 2018

(65) Prior Publication Data

US 2020/0191281 A1 Jun. 18, 2020

(51) Int. Cl.
| | |
|---|---|
| *F16K 5/06* | (2006.01) |
| *F16K 5/10* | (2006.01) |
| *B05B 1/30* | (2006.01) |
| *G05D 23/13* | (2006.01) |
| *F24D 17/02* | (2006.01) |

(52) U.S. Cl.
CPC .......... *F16K 5/0605* (2013.01); *B05B 1/3066* (2013.01); *F16K 5/10* (2013.01); *G05D 23/1393* (2013.01); *F24D 17/02* (2013.01)

(58) Field of Classification Search
CPC ....... F16K 5/0605; F16K 5/10; B05B 1/3066; G05D 23/1393
See application file for complete search history.

(56) References Cited

U.S. PATENT DOCUMENTS

| | | | | |
|---|---|---|---|---|
| 5,494,077 A | * | 2/1996 | Enoki et al. ....... | G05D 23/1353 137/625.17 |
| 5,615,709 A | * | 4/1997 | Knapp .................. | F16K 11/087 137/625.41 |
| 5,740,836 A | * | 4/1998 | Tang ...................... | F16K 11/087 137/625.41 |
| 7,182,100 B2 | * | 2/2007 | Pinette .................. | F16K 11/076 137/625.4 |
| 2014/0144248 A1 | * | 5/2014 | Walters ..................... | G01F 1/44 73/861.61 |

* cited by examiner

*Primary Examiner* — Kevin L Lee
(74) *Attorney, Agent, or Firm* — Burns & Levinson, LLP; George N. Chaclas

(57) ABSTRACT

A mixing valve assembly includes a valve housing defining an interior, a cold inlet along a first axis, a hot inlet, and a mixed outlet. A metering ball within the interior rotates about the first axis. The metering ball has an outer shell defining: a cold port aligned with the cold inlet; a hot port selectively aligned with the hot inlet; a cold outlet connected to the cold port; and a hot outlet connected to the hot port. Rotation of the metering ball aligns the hot port with the hot inlet, the cold outlet with the mixed outlet, and the hot outlet with the mixed outlet to varying degrees. The metering ball has a central flowpath for hot water and a radially outward flowpath for cold water.

10 Claims, 12 Drawing Sheets

ELECTRIC MIXING VALVE WITH DUAL FLOWPATH METERING BALL

BACKGROUND

1. Field of the Technology

The subject disclosure relates to hot water temperature control, and more particularly to electric mixing valves with improved metering balls.

2. Background of the Related Art

In commercial and residential settings, hot water temperature control is important to prevent scalding and insure efficient operation of the water system. An important component of the water system is mixing valves. Mixing valves that are substantially automatic, yet provide variable, mixing water control allow the water system to operate effectively.

SUMMARY

In view of the above, a need exists for a mixing valve that is easy to install and operate while providing automatic operation in a robust and safe manner.

The present disclosure is directed to a mixing valve assembly that includes a valve housing defining an interior, a cold inlet along a first axis, a hot inlet, and a mixed outlet. A metering ball within the interior rotates about the first axis. The metering ball has an outer shell defining: a cold port aligned with the cold inlet; a hot port selectively aligned with the hot inlet; a cold outlet connected to the cold port; and a hot outlet connected to the hot port. Rotation of the metering ball aligns the hot port with the hot inlet, the cold outlet with the mixed outlet, and the hot outlet with the mixed outlet to varying degrees. A central tube extends from the hot port to the hot outlet to define a central flowpath through the metering ball. A radially outward flowpath extends from the cold port to the cold outlet around the central tube. The metering ball rotates about the first axis so that fluid passes through the central flowpath and the radially outward flowpath simultaneously.

Preferably, the mixing valve also includes a sensor coupled to the mixed outlet for sending a temperature signal. A controller receives the temperature signal and generates a control signal based on the temperature signal. An actuator is coupled to the dual flowpath metering ball for receiving the control signal and setting a position of the dual flowpath metering ball based on the control signal. During a power outage, the actuator rotates the dual flow metering ball so that the cold outlet is fully aligned with the mixed outlet for full cold flow. For a sanitation mode, the actuator rotates the dual flow metering ball so that the hot outlet is fully aligned with the mixed outlet for full hot flow.

Another embodiment of the present disclosure includes an electric mixing valve assembly including a controller operably connected to a mixing valve. The mixing valve has a sensor for sending a temperature signal to the controller and an actuator for receiving a control signal from the controller based on the temperature signal. A valve housing defines an interior in fluid communication with a first inlet along a first axis, a second inlet along a second axis and an outlet along the second axis. A metering ball is mounted for rotation within the interior about the first axis. The metering ball has an outer shell that defines a slot for coupling to the actuator to selectively rotate the metering ball and set a desired position based upon the control signal. The metering ball also has a first port concentric about the first axis for alignment with the first inlet, and a second port at a 90° angle to the first port so that rotation of the metering ball selectively fully aligns the second port with the second inlet. A first set of outlet slots is in fluid communication with the first port so that rotation of the metering ball selectively fully aligns the first set of outlet slots with the outlet. A second set of outlet slots is in fluid communication with the second port so that rotation of the metering ball selectively fully aligns the second set of outlet slots with the outlet. Within the metering ball, a central tube extends from the second port to the second set of outlet slots to define a central flowpath. A radially outward flowpath extends from the first port to the first set of outlet slots around the central tube through the metering ball. In one embodiment, the actuator selectively rotates the metering ball so that fluid passes through the central flowpath and the radially outward flowpath simultaneously to create a mixed flow in the outlet. The first and second axes can be substantially perpendicular but may also be at a different angle.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed technology appertains will more readily understand how to make and use the same, reference may be had to the following drawings.

DETAILED DESCRIPTION OF PREFERRED EMBODIMENTS

Figure 1:
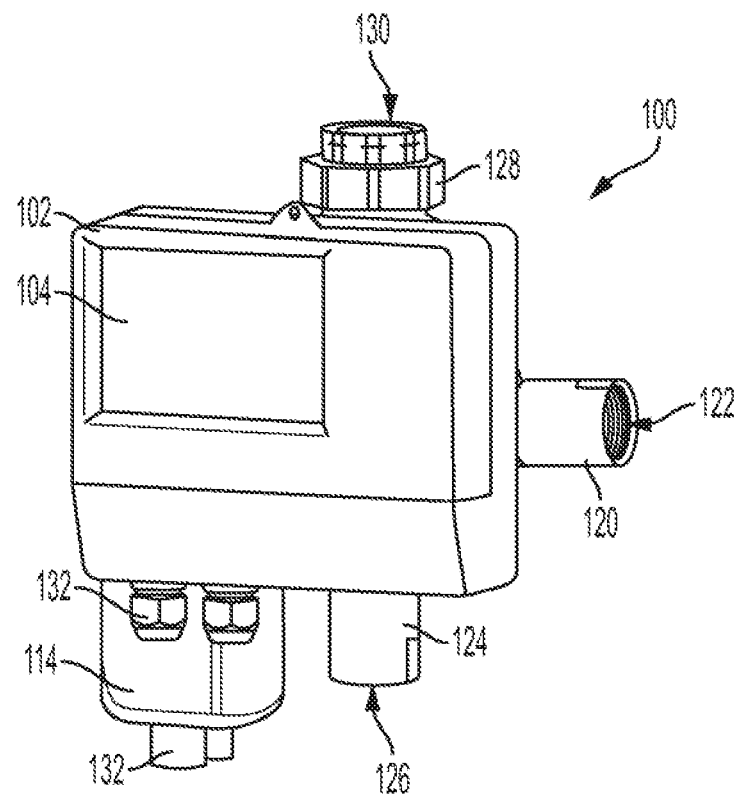
FIG. 1 is a front perspective view of an electronic mixing valve assembly in accordance with the subject disclosure.

The subject technology overcomes many of the prior art problems associated with electric mixing valves. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Directional indications such as upward, downward, right, left and the like are used with respect to the figures and not meant in a limiting manner.

Figure 2:
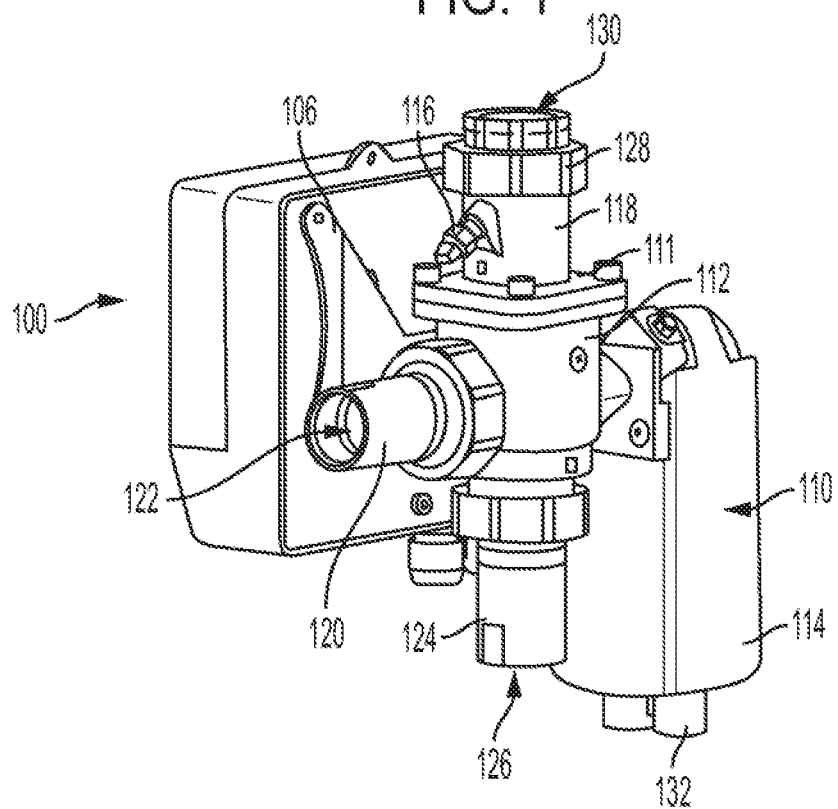
FIG. 2 is a rear perspective view of an electronic mixing valve assembly in accordance with the subject disclosure.

Referring now to the FIGS. 1 and 2, front and rear perspective views of an electronic mixing valve assembly 100 in accordance with the subject disclosure are shown. The mixing valve assembly 100 has a controller 102 with a touch screen display 104. The display 104 can be used to setup and operate the mixing valve assembly 100. The mixing valve assembly 100 can provide a flow of cold water, hot water or mixed flow as described in more detail below.

The set point for the mixed water flow is programmable for a wide range of temperatures such as 60° F. to 180° F. In one embodiment, the display 104 shows the date and time with the setpoint and current mixed water temperature. The mixing valve assembly 100 maintains the setpoint within 2° F. The controller 102 also includes memory for storing data such as error messages with associated date and time stamps. The controller 102 is also Wi-Fi enabled. In one embodiment, the controller 102 has battery backup, which may be internal or external. Preferably, the controller 102 communicates with a building automation system for sending and receiving status and control information for remote monitoring. For example, high and low temperature alerts may be programmed into the controller 102.

The mixing valve assembly 100 includes a mixing valve 110 and a valve actuator 114. The controller 102 is mounted to the mixing valve 110 by a plate 106. The controller 102 is in communication with a sensor 116 and the actuator 114 to monitor and control operation of the mixing valve 110. The communication between the controller 102, the actuator 114, and the sensor 116 may be wireless and/or hard wired. In the shown embodiment, the controller 102 and actuator 114 have conduits 132 for communication by electrical wires (not shown).

The mixing valve 110 has a two part housing 111. The housing 111 includes a valve body 112 and a valve adapter 118 that define an interior 125 (see FIG. 5). The housing 111 may be a single component but a two-part housing facilitates manufacturing and assembly. A first tailpiece 120 connects to the valve body 112 and defines a cold inlet 122. A second tailpiece 124 connects to the valve body 112 and defines a hot inlet 126. A nut 128 connects to the valve adapter 118 and defines an outlet 130. The tailpieces 120, 124 and nut 128 are adapted to couple into a fluidic network. As can be seen, the sensor 116 is mounted in the valve adapter 118 for sensing the temperature of fluid exiting the mixing valve 110. The sensor 116 may also be configured to determine the pressure of the fluid exiting the mixing valve 110. The components of the mixing valve 110 may be fastened together by threads, welding, epoxy, fasteners and the like not described in detail but plainly visible in the figures. Preferably, the mixing valve 100 has a lead free construction, fabricated from material such as bronze, brass, stainless steel, polytetrafluoroethylene (PTFE) tubing, zinc plated steel, die cast aluminum, glass filled noryl and the like.

Figure 3:
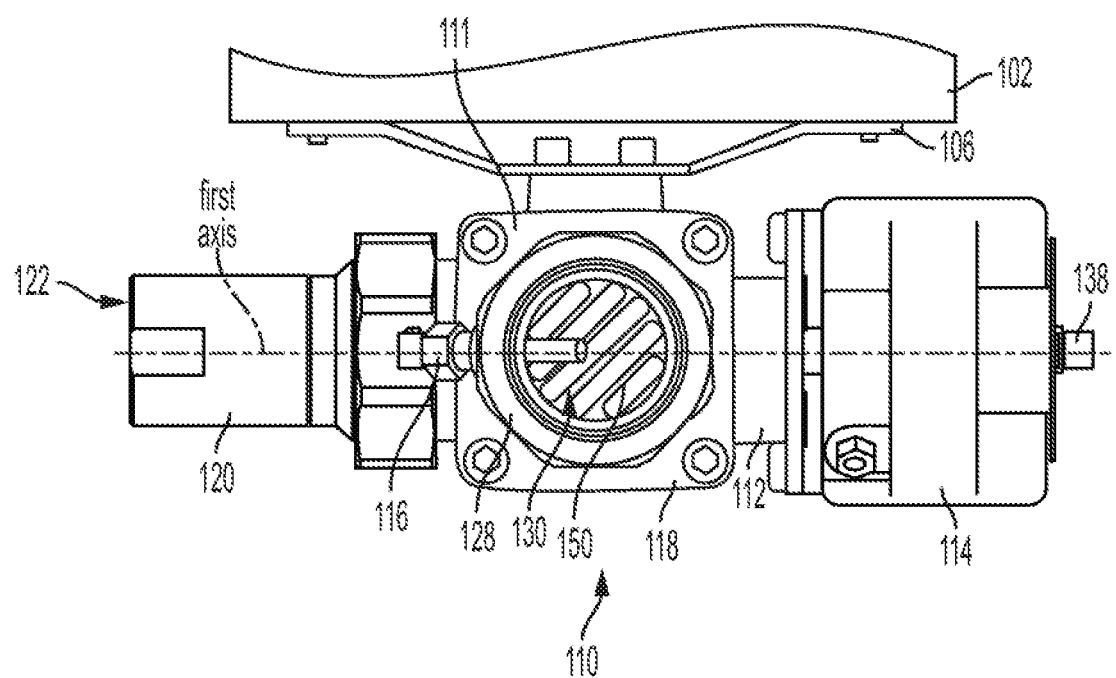
FIG. 3 is a top view of an electronic mixing valve assembly in accordance with the subject disclosure.
Figure 4:
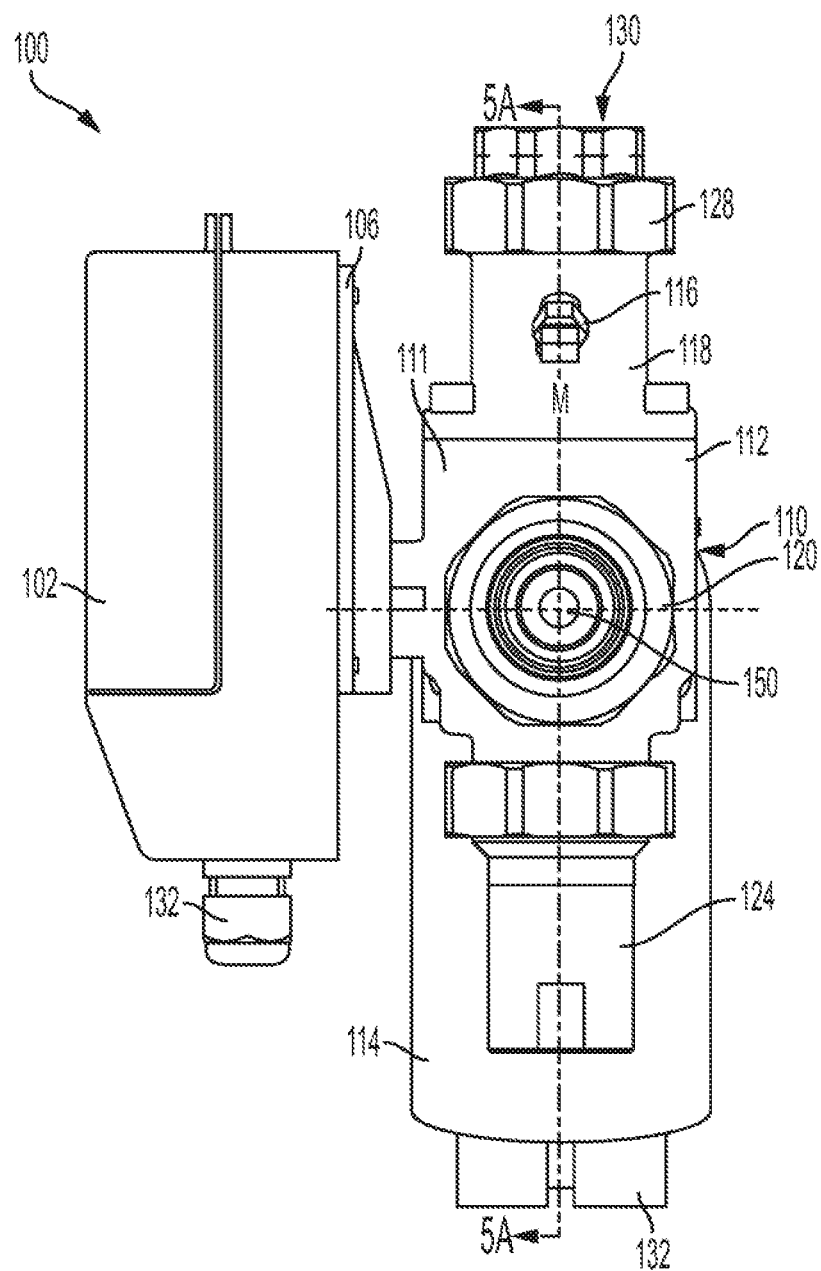
FIG. 4 is a side view of an electronic mixing valve assembly in accordance with the subject disclosure.

Referring now to FIGS. 3 and 4, top and side views of the electronic mixing valve assembly 100 are shown. As can be seen through the cold inlet 122 and outlet 130, a metering ball 150 is mounted in the interior 125 to selectively block a flowpath therebetween. Similarly, the metering ball 150 also selectively blocks a flowpath between the hot inlet 126 and outlet 130.

Figure 5:
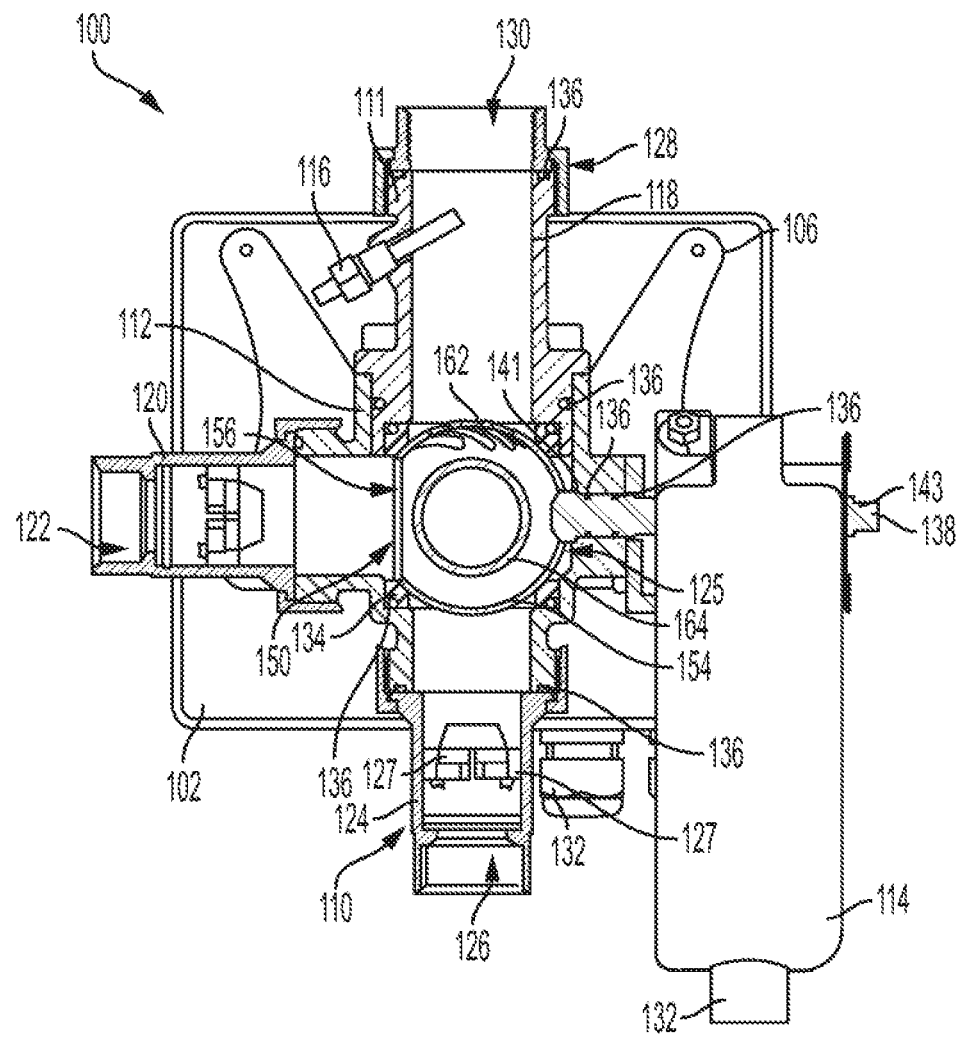
FIG. 5 is a cross-sectional view of the electronic mixing valve assembly taken along line 5-5 of FIG. 4.
Figure 9A:
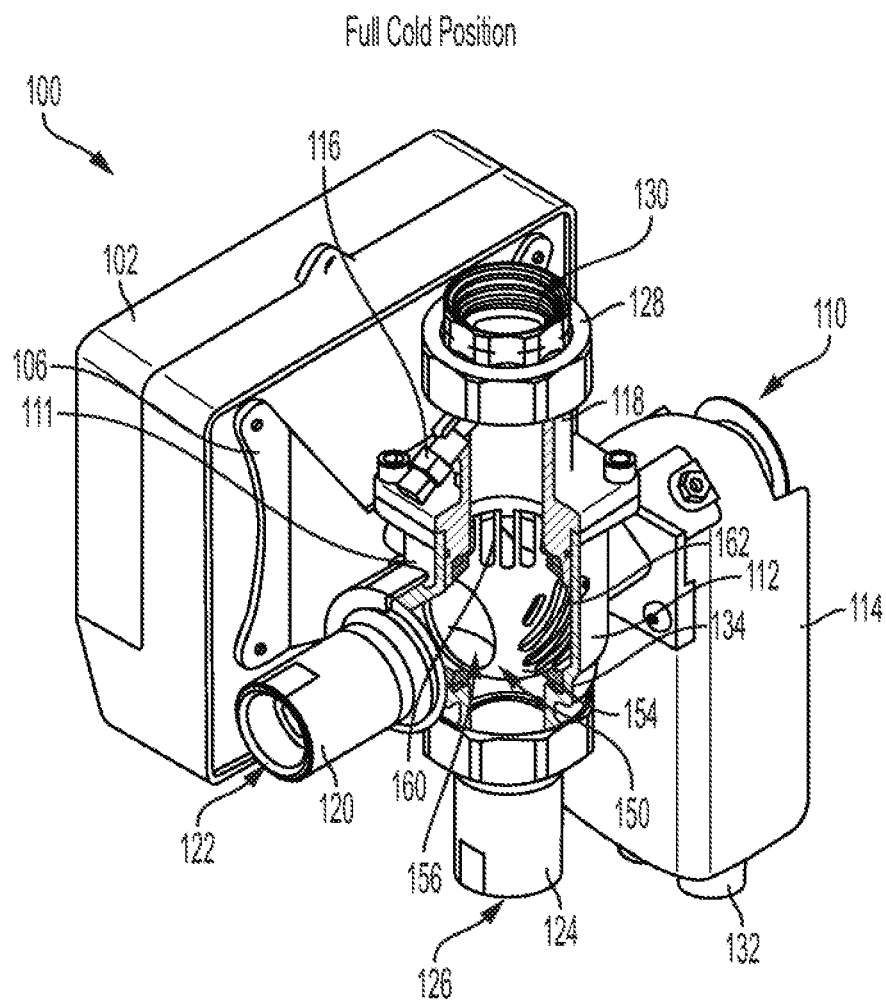
FIG. 9A a partial cross-sectional view of an electronic mixing valve assembly with the hot flowpath closed and the cold flowpath open in accordance with the subject disclosure.

Referring now to FIG. 5, a cross-sectional view of the electronic mixing valve assembly 100 taken along line 5-5 of FIG. 4 is shown. The mixing valve assembly 100 is shown set to flow full cold water through the outlet 130 as is also shown in FIG. 9A. For example, the controller 102 may set the actuator 114 to drive the mixing valve 110 to full cold flow during a power outage for safety reasons. The mixing valve assembly 100 can also be set to full hot water (see FIG. 9B) or a mixed output (see FIG. 9C).

In the full cold water flow setting, water flows through the cold inlet 122 along a first axis into the interior 125. The water passes through the metering ball 150, which redirects the water through the outlet 130 along a second axis. The metering ball 150 is mounted for rotation about the first axis within the interior 125. Valve seats 134 and various o-ring 136 form fluid tight seals to prevent unwanted leakage from the interior 125 and in other locations along the flowpaths. The electronic mixing valve assembly 100 also includes check modules 127 in the tailpieces 120, 124. The check modules assure flow of water in one direction to prevent such problems as thermal siphoning of the hot water to the cold water supply. The check modules 127 may also include strainers to prevent contamination with particles that could impede the proper operation of the electronic mixing valve assembly 100.

Figure 6A:
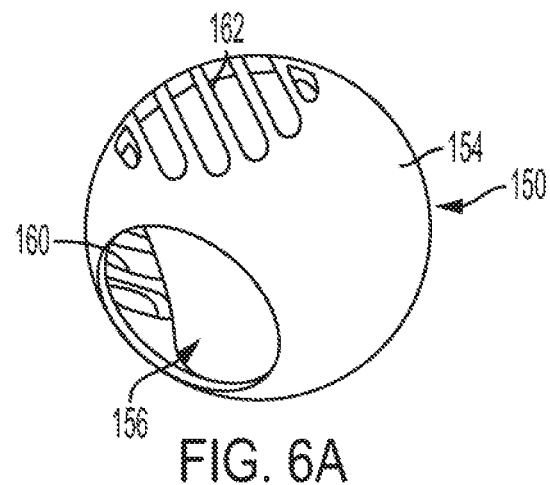
FIG. 6A is a perspective view illustrating a cold inlet port of a metering ball for an electronic mixing valve assembly in accordance with the subject disclosure.
Figure 6B:
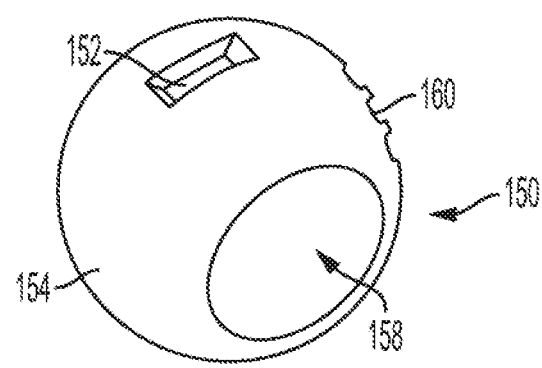
FIG. 6B is a perspective view illustrating a hot inlet port of a metering ball for an electronic mixing valve assembly in accordance with the subject disclosure.

To accomplish the different settings (e.g., rotate the metering ball 150), the actuator 114 has a valve stem 138 that couples to a stem slot 152 formed in the metering ball 150 (see FIG. 6B). To rotate the metering ball 150 about the first axis, the actuator 114 drives the valve stem 138 to rotate about the first axis as well. A thrust washer 141 supports the valve stem 138. In one embodiment, the valve stem 138 has a hexagonal shaped proximal end 143 to allow for manual rotation with a wrench during a power outage. The rotation of the valve stem may be limited by mechanical stops and/or by calibrated software control of the range of motion.

Figure 6C:
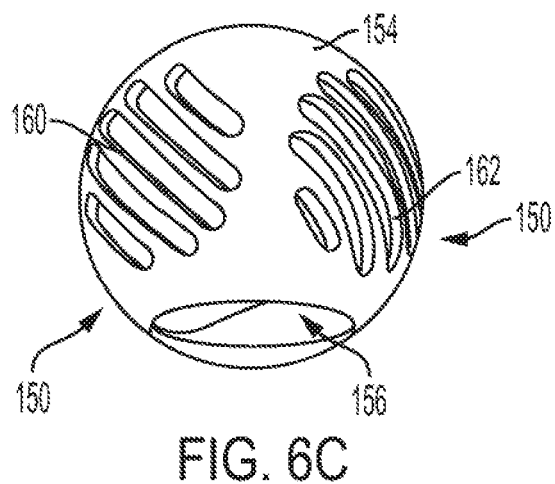
FIG. 6C is a perspective view illustrating cold outlet slots and hot outlet slots of a metering ball for an electronic mixing valve assembly in accordance with the subject disclosure.

Referring now to FIGS. 6A-C three different perspective views of the metering ball 150 are shown. The metering ball 150 is largely spherical with an outer shell 154 defining the stem slot 152 as well as a cold inlet port 156 and a hot inlet port 158. The cold inlet port 156 is in fluid communication with cold outlet slots 160. Similarly, the hot inlet port 158 is in fluid communication with hot outlet slots 162. Preferably, the outlet slots 160, 162 are parallel slots that fit in a circular pattern. Other configurations such as a plurality of small circles arranged in a triangular or oval pattern may be utilized.

Figure 7A:
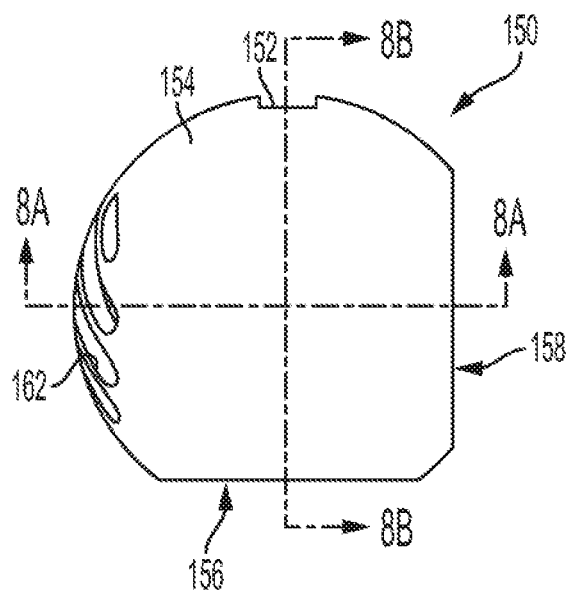
FIG. 7A is a first plan view of a metering ball in accordance with the subject disclosure.
Figure 7B:
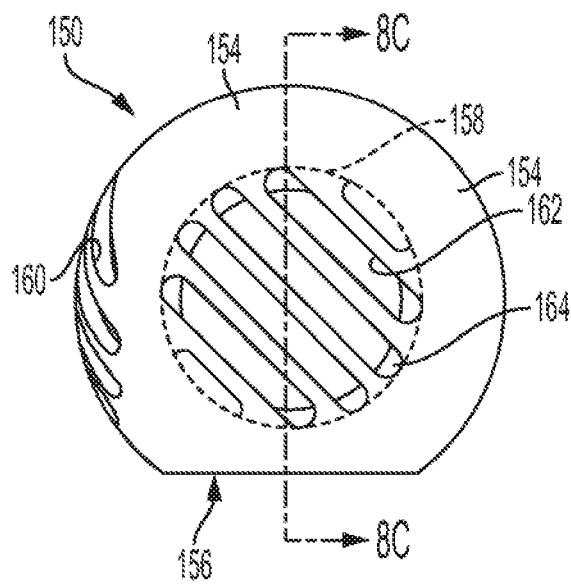
FIG. 7B is a second plan view of a metering ball in accordance with the subject disclosure.
Figure 7C:
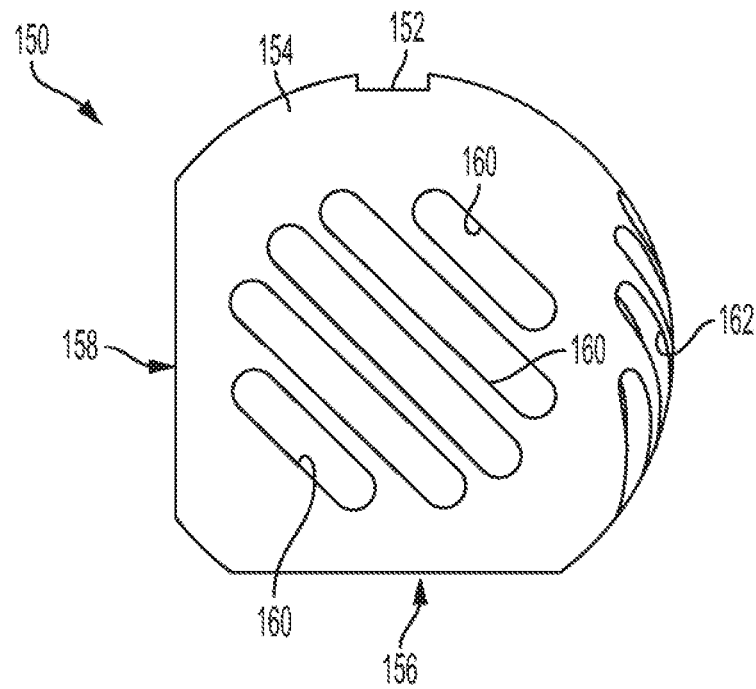
FIG. 7C is a third plan view of a metering ball in accordance with the subject disclosure.
Figure 7D:
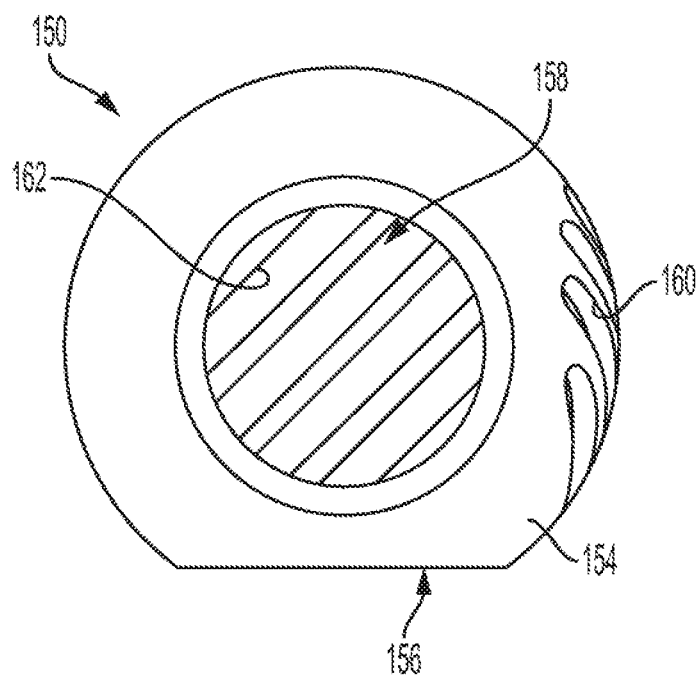
FIG. 7D is a fourth plan view of a metering ball in accordance with the subject disclosure.
Figure 8A:
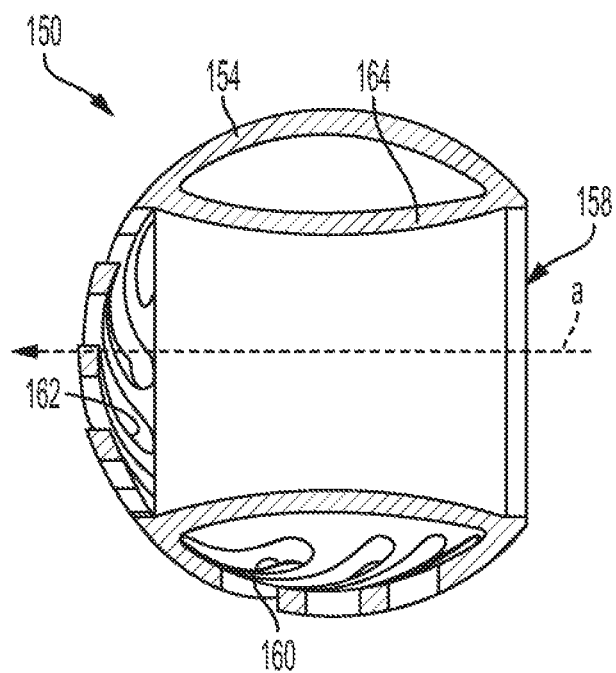
FIG. 8A is a cross-sectional view taken along line 8A-8A of FIG. 7A.
Figure 8B:
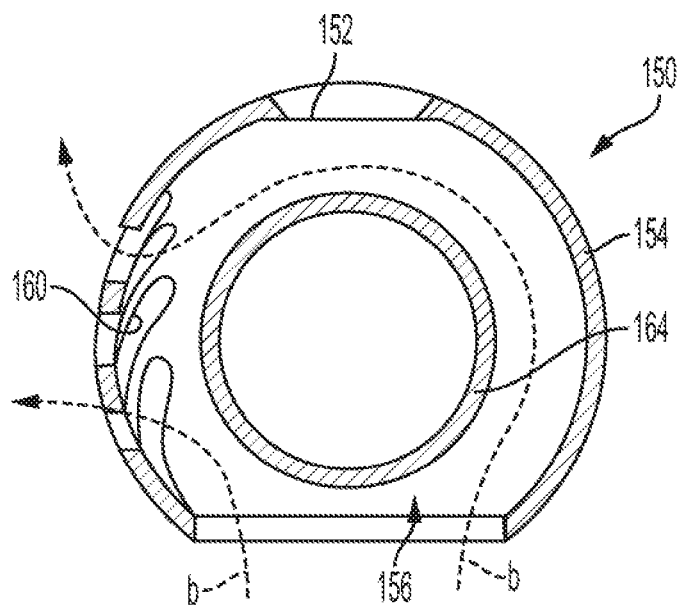
FIG. 8B is a cross-sectional view taken along line 8B-8B of FIG. 7A.
Figure 8C:
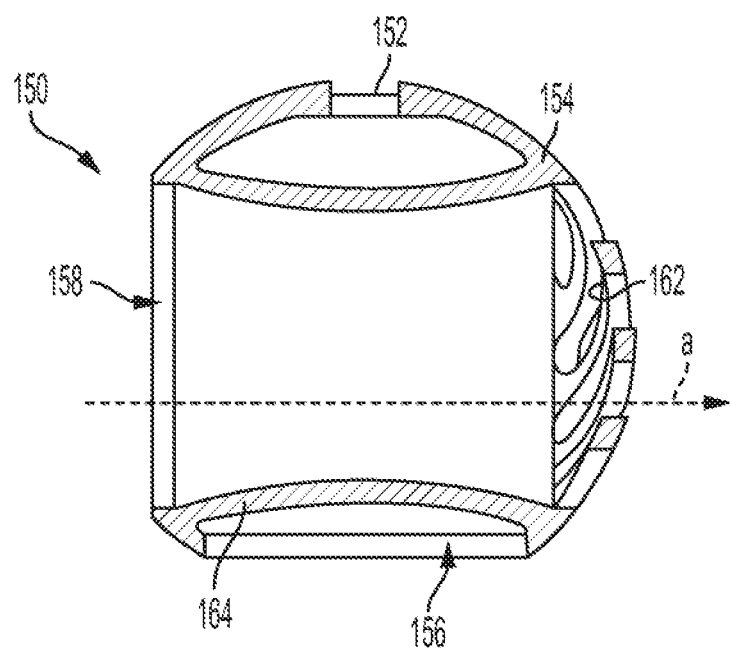
FIG. 8C is a cross-sectional view taken along line 8C-8C of FIG. 7B.
Figure 9B:
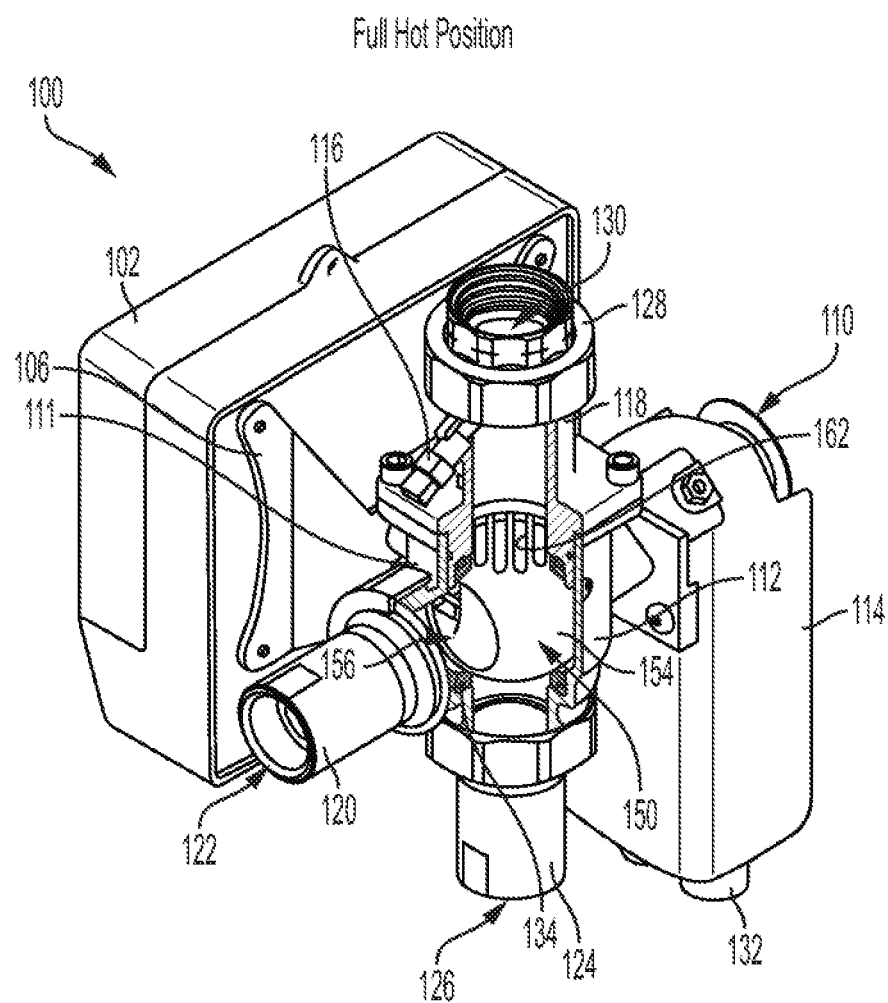
FIG. 9B a partial cross-sectional view of an electronic mixing valve assembly with the hot flowpath open and the cold flowpath closed in accordance with the subject disclosure.

Referring now to FIGS. 7A-D, several plan views of the metering ball 150 are shown. Three cross-sections are taken of FIGS. 7A and 7B as shown in FIGS. 8A-C, which are additionally referred to now. It is noted that the hot inlet port 158 is shown in phantom line in FIG. 7B. In particular, the hot inlet port 158 is connected to the hot outlet slots 162 by a central tube 164 (see FIGS. 8A-C). The central tube 164 has a gradually decreasing diameter towards the center of the metering ball 150 (see FIGS. 8A and 8C). When the metering ball 150 is rotated so that the hot inlet port 158 aligns with the hot inlet 126, the hot water passes freely through the central tube 164 and the hot outlet slots 162 for egress by the outlet 130 (see FIG. 9B). In other words, the controller 102 has the actuator 114 drive the valve stem 138 and, in turn, the metering ball 150 to align the hot inlet port 158 with the hot inlet 126 to fully open the hot water flowpath (illustrated by arrow a in FIGS. 8A and 8C) through the mixing valve 110 while fully closing the cold water flowpath. As best seen in FIG. 9B, when the maximum hot water flow occurs, the hot water flows in a substantially straight line through the mixing valve 110 along the second axis. The shape of the central tube 164 and the hot outlet slots 162 cause some beneficial throttling. For a sanitation mode, the actuator 114 rotates the dual flow metering ball 150 so that the hot outlet slots 162 are fully aligned with the mixed outlet 130 for full hot flow.

Figure 9C:
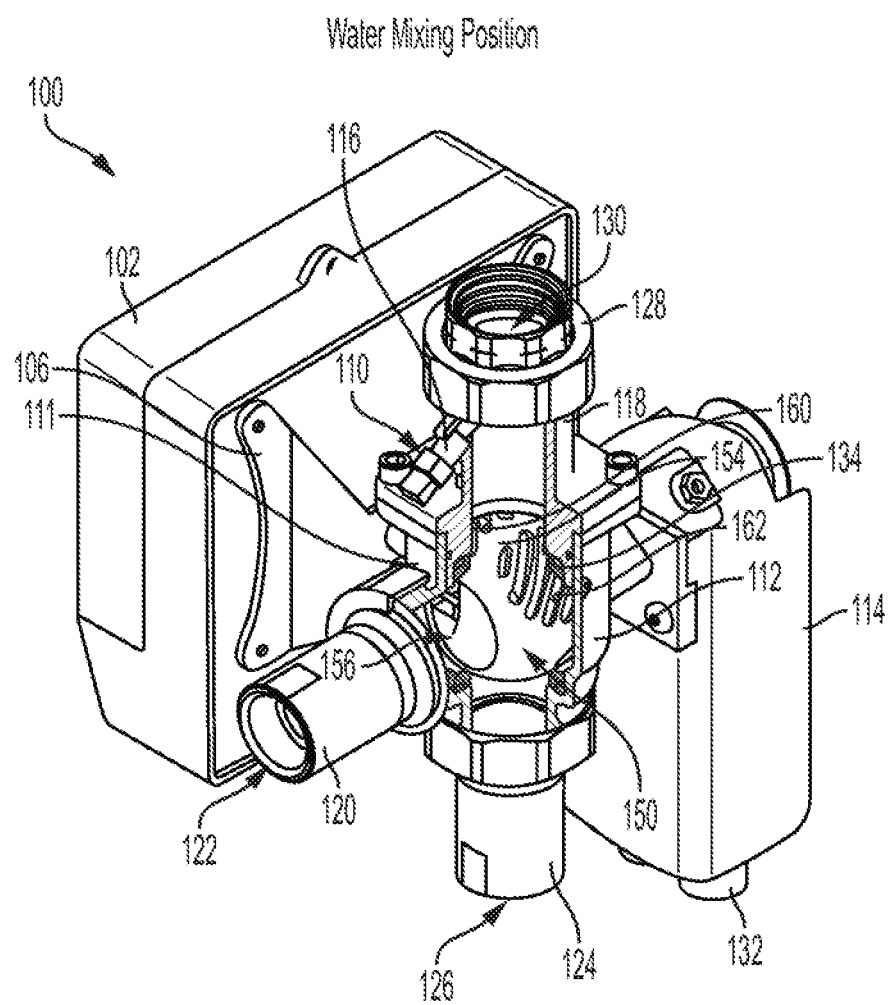
FIG. 9C a partial cross-sectional view of an electronic mixing valve assembly with the hot and cold flowpaths partially open to mix the fluid in accordance with the subject disclosure.

The cold water flowpath through the metering ball 150, illustrated by arrows b in FIG. 8B, is an annular flowpath that surrounds the central tube 164. As can be seen in FIGS. 9A-C, the cold water port 156 of the metering ball 150 is always aligned with the cold water inlet 122 of the mixing valve 110 because the metering ball 150 rotates about the first axis, which passes centrally through the cold water port 156. However, when the metering ball 150 is rotated so that the cold water outlet slots 160 align with the outlet 130, the cold water passes around the central tube 164 and through the cold water outlet slots 160 for egress by the outlet 130 (see FIG. 9A). In other words, the controller 102 has the actuator 114 drive the valve stem 138 and, in turn, the metering ball 150 to align the cold water outlet slots 160 with the outlet 130 to fully open the cold water flowpath through the mixing valve 110 while fully closing the hot water flowpath. As best seen in FIGS. 5 and 9A, when the maximum cold water flow occurs, the cold water flows in a winding path around the central tube 164 to make a substantially 90° upward turn through the mixing valve 110 along the second axis. As such, the winding path and the cold water outlet slots 160 cause some beneficial throttling. It is envisioned that the controller 102 would drive or mechanically default to this maximum cold water flow during a power outage for safety. The surface 154 of the metering ball 150 may also be rotated to a location where neither of the outlet slots 160, 162 are aligned with the mixed outlet 130 (i.e., a no flow condition). As such, partial hot and/or cold flow positions would also be possible. However, in a preferred embodiment, the actuator 114 is configured and arranged to only move the metering ball 150 between the full hot flow and the full cold flow positions.

Referring now in particular to FIG. 9C, a partial cross-sectional view of the electronic mixing valve assembly 100 is shown with the hot and cold flowpaths partially open to mix the fluid. To partially open the cold flowpath, the metering ball 150 is rotated so that the cold water outlet slots 160 partially align with the outlet 130. At the same time, the hot water flowpath is partially open because the hot water inlet port 158 partially aligns with the hot water inlet 126 as well as the hot water outlet slots 162 partially aligning with the outlet 130. As a result, both hot and cold water pass into and mix in the outlet 130. Additional heat exchange may occur inside the metering ball 150 as the central tube 164 will exchange energy between the hot and cold water. To vary the mix of hot and cold water to result in the setpoint temperature, the controller 102 rotates the metering ball 150 to vary the ratio of cold water outlet slots 160 to hot water outlet slots 162 aligned with the outlet 130. The outlet slots 160, 162 are arranged and configured to generate turbulence for effective mixing within the mixing valve 110.

Preferably, the outlet slots 160, 162 are shaped to provide a non-linear opening area characteristic that provides a more linear flow of the mixing of the hot and cold water proportion as the metering ball 150 is rotated. Typically, flow is a squared function of the open area.

In one embodiment the electronic mixing valve assembly 100 has a maximum operating pressure of 200 psi. It is envisioned that a pressure drop of 5-50 psi may occur across the electronic mixing valve assembly 100. The hot water is preferably under 200° F. and at least 2° F. above the setpoint. The inlet hot water temperature may range from 120–180° F. with an inlet cold water temperature of 39-60° F. A minimum flow of 0.5 gpm is typical with a temperature adjustment range of 60–180° F. Further, the electronic mixing valve assembly 100 is compliant with all local standards as needed.

The size of the electronic mixing valve assembly 100 varies to be suited to the fluid network. The inlets and outlet may be 0.75 inch, which would result in an electronic mixing valve assembly that weighs about 13 lb. In another embodiment, the inlets and outlet may be 1 inch and 1.25 inch, respectively, which would result in an electronic mixing valve assembly that weighs about 17 lb. The size of the larger electronic mixing valve assembly would be approximately 10×6×10 inches.

Preferably, the metering ball for the 1.25 inch metering valve assembly would have a diameter of about 2.5 inch. The hot inlet port would have a diameter of about 1.468 inch. In one embodiment, the central tube 164 narrows to a minimum diameter of 1.250 inch. The cold inlet port has a diameter of about 1.500 inch. The hot and cold outlet slots would have a width of about 0.188 inch with about 0.100 inch between each slot. The length of the slots varies to fit within a circle of approximately the same diameter as the respective inlet port. As can be seen in FIGS. 7B and 7C, there are 6 hot outlet slots and 5 cold outlet slots but many combinations and configurations are possible such as the same shape and configuration of slots for each outlet.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment.

While the subject technology has been described with respect to preferred embodiments, those skilled in the art will readily appreciate that various changes and/or modifications can be made to the subject technology without departing from the spirit or scope of the subject technology as defined by the appended claims. For example, each claim may depend from any or all claims in a multiple dependent manner even though such has not been originally claimed.

What is claimed is:

1. A mixing valve assembly comprising:
   a valve housing defining an interior in fluid communication with a cold inlet along a first axis, a hot inlet and a mixed outlet; and
   a dual flowpath metering ball mounted for rotation within the interior about the first axis, the dual flowpath metering ball having:
   an outer shell defining: a cold inlet port concentric about the first axis for alignment with the cold inlet; a hot inlet port at an angle to the cold inlet port so that rotation of the metering ball selectively aligns the hot inlet port with the hot inlet; a cold outlet in fluid communication with the cold inlet port so that rotation of the metering ball selectively aligns the cold outlet with the mixed outlet; and a hot outlet in fluid communication with the hot inlet port so that rotation of the metering ball selectively aligns the hot outlet with the mixed outlet; and
   a central tube extending from the hot inlet port to the hot outlet for defining a central flowpath through the metering ball and a radially outward flowpath from the cold inlet port to the cold outlet, the radially outward flowpath passing around the central tube radially outward relative to the central tube through the dual flowpath metering ball,
   wherein the dual flowpath metering ball selectively rotates about the first axis so that fluid passes through the central flowpath and the radially outward flowpath simultaneously to create a mixed flow in the outlet.

2. A mixing valve assembly as recited in claim 1, further comprising:
   a sensor coupled to the mixed outlet for sending a temperature signal;
   a controller for receiving the temperature signal and generating a control signal based on the temperature signal; and
   an actuator coupled to the dual flowpath metering ball for receiving the control signal and setting a position of the dual flowpath metering ball based on the control signal.

3. A mixing valve assembly as recited in claim 2, wherein during a power outage, the actuator rotates the dual flow metering ball so that the cold outlet is fully aligned with the mixed outlet for full cold flow.

4. A mixing valve assembly as recited in claim 2, wherein for a sanitation mode, the actuator rotates the dual flow metering ball so that the hot outlet is fully aligned with the mixed outlet for full hot flow.

5. A mixing valve assembly as recited in claim 1, wherein the angle is a 90° angle, the cold outlet is a plurality of parallel slots, and the hot outlet is a plurality of parallel slots.

6. An electric mixing valve assembly comprising:
   a controller; and
   a mixing valve having:
   a sensor for sending a temperature signal to the controller;
   an actuator for receiving a control signal from the controller based on the temperature signal;
   a valve housing defining an interior in fluid communication with a first inlet along a first axis, a second inlet along a second axis and an outlet along the second axis, wherein the sensor is coupled to the outlet; and
   a metering ball mounted for rotation within the interior about the first axis, the metering ball having:
   an outer shell defining: a slot for coupling to the actuator to selectively rotate the metering ball and set a desired position based upon the control signal; a first port concentric about the first axis for alignment with the first inlet; a second port at a 90° angle to the first port so that rotation of the metering ball selectively fully aligns the second port with the second inlet; a first set of outlet slots in fluid communication with the first port so that rotation of the metering ball selectively fully aligns the first set of outlet slots with the outlet; and a second set of outlet slots in fluid communication with the second port so that rotation of the metering ball selectively fully aligns the second set of outlet slots with the outlet; and
   a central tube extending from the second port to the second set of outlet slots for defining a central flowpath through the metering ball and a radially outward flowpath from the first port to the first set of outlet slots around the central tube through the metering ball.

7. An electric mixing valve assembly as recited in claim 6, wherein the actuator selectively rotates the metering ball so that fluid passes through the central flowpath and the radially outward flowpath simultaneously to create a mixed flow in the outlet.

8. An electric mixing valve assembly as recited in claim 6, wherein the first and second axes are perpendicular.

9. An electric mixing valve assembly as recited in claim 6, the first inlet, the second inlet, the outlet, the first port, and the second port all are circular and have diameters that are equal.

10. An electric mixing valve assembly as recited in claim 9, the first and second set of outlet slots form a circular pattern having a diameter equal to the diameter of the outlet.

* * * * *